May 27, 1924.

C. S. LOWELL 1,495,232

GAS, OIL, OR ELECTRIC STOVE EXTENSION

Filed July 30, 1923

Inventor
Constance S. Lowell.

By Samuel Herrick,
Attorney

Patented May 27, 1924.

1,495,232

UNITED STATES PATENT OFFICE.

CONSTANCE S. LOWELL, OF FLAGSTAFF, ARIZONA.

GAS, OIL, OR ELECTRIC STOVE EXTENSION.

Application filed July 30, 1923. Serial No. 654,694.

*To all whom it may concern:*

Be it known that I, CONSTANCE S. LOWELL, a citizen of the United States, residing at Flagstaff, in the county of Coconino and State of Arizona, have invented certain new and useful Improvements in Gas, Oil, or Electric Stove Extensions, of which the following is a specification.

This invention relates to heat conserving and area increasing extensions for oil, gas or electric stoves or grills and it has for its object to provide a plurality of elements adapted to substantially surround and enclose an electric, oil, or gas hot-plate or grill and serving to hold and conserve heat which would otherwise be wasted and serving further to increase the area of the top of the stove for keeping food, which has been cooked on the grill proper, warm, for any desired length of time.

Further objects and advantages of the invention will be set forth in the detailed description which follows.

In the accompanying drawing.

Like numerals designate corresponding parts in all of the figures of the drawing.

Figure 1:
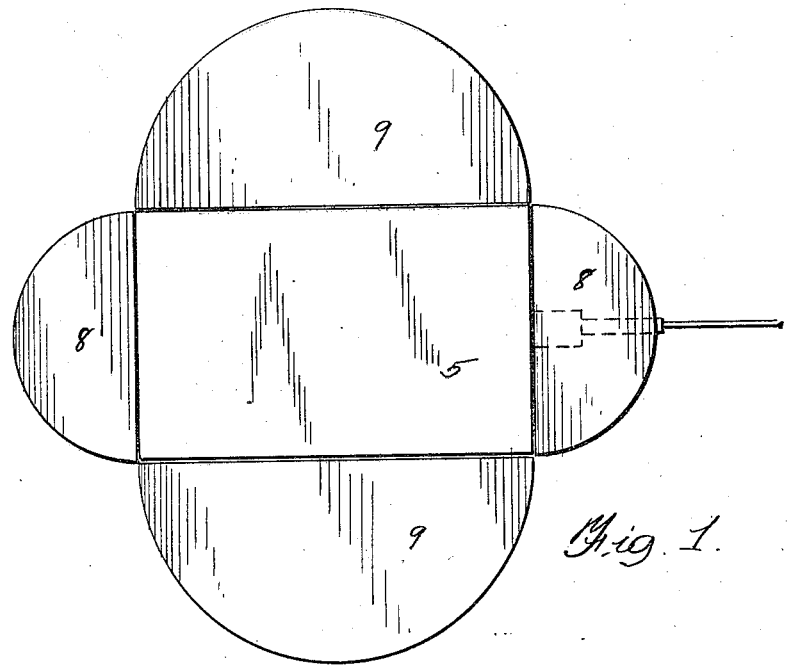
Fig. 1 is a plan view of a grill showing the attachment of the present invention associated therewith.
Figure 2:
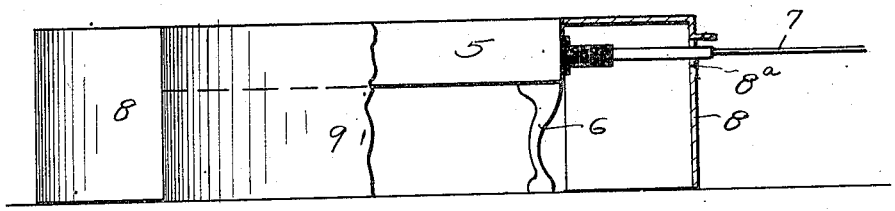
Fig. 2 is a view partly in side elevation and partly in vertical section.
Figure 3:
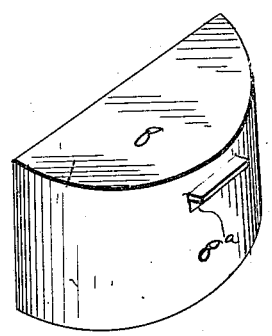
Fig. 3 is a perspective view of one of the extension attachments.

In the drawing 5 designates a hot plate, grill or electric, gas or oil stove which is supported upon legs 6. If the stove is an electric one current may be supplied through a cord 7 in a usual and well known way.

In carrying out the invention I provide a plurality of, preferably, semi-circular hollow extensions 8—8, 9—9, the former being adapted to fit up against the ends of a stove and the latter fitting along the sides of the stove. The right-hand extension element 8 is provided with an opening 8ᵃ for the passage of the cord 7 and a shield above said opening to protect the cord 7 from fluids which may "boil over" upon the stove. When the elements 8—8 are brought together to form a complete circle they may be nested within the elements 9—9 when the latter are likewise brought together to form a complete circle and thus these several elements may be conveniently transported or stored in a small space. The extension elements are open on their sides toward the stove sides so that the heat trapped by the presence of these elements may find its way to the interior of the several extensions and heat the said extensions to such a degree that articles of food which have already been cooked may be kept in a heated condition for any desired length of time.

While I have shown the extension abutting against the ends and sides of the stove, it is apparent that they may just as readily be spaced from the stove to a greater or lesser extent, thus not only varying the degree of heat trapped but increasing the effective supporting area for pots, pans, kettles and the like. It is clear that such cooking utensils will span the space between the stove and extension if the latter be spaced only a limited distance from the stove.

It is to be understood that the invention is not limited to the precise construction set forth but that it includes within its purview whatever changes fairly come within either the terms or the spirit of the appended claims.

Having described my invention what I claim is:

1. The combination with an electric grill including supporting legs, of a plurality of extension elements closed along all sides except their inner sides and bottom and comprising flat tops which lie in the plane of the top of the heating element and sides which equal in height the height of the legs and body of the heating element.

2. The combination with a heating element, of a plurality of extension elements of semi-circular formation adapted to fit against the ends and sides of the heating element and open only along their inner sides and bottom, some of said extension elements being of such size as to nest within others of said extensions.

In testimony whereof I affix my signature in the presence of two witnesses.

CONSTANCE S. LOWELL.

Witnesses:
E. F. MESSINGER,
EDWARD WATSON SUPPLE.